(12) United States Patent
Chou (10) Patent No.: US 12,212,708 B2
(45) Date of Patent: Jan. 28, 2025

(54) RINGING SUPPRESSION CIRCUIT

(71) Applicant: AMAZING MICROELECTRONIC CORP., New Taipei (TW)

(72) Inventor: Ting-Yi Chou, Zhubei (TW)

(73) Assignee: AMAZING MICROELECTRONIC CORP., New Taipei (TW)

( * ) Notice: Subject to any disclaimer, the term of this patent is extended or adjusted under 35 U.S.C. 154(b) by 290 days.

(21) Appl. No.: 18/074,894

(22) Filed: Dec. 5, 2022

(65) Prior Publication Data

US 2024/0187533 A1 Jun. 6, 2024

(51) Int. Cl.
*H04M 19/02* (2006.01)
*H04L 25/02* (2006.01)

(52) U.S. Cl.
CPC ........ *H04M 19/026* (2013.01); *H04L 25/026* (2013.01); *H04L 25/028* (2013.01)

(58) Field of Classification Search
CPC .. H04M 19/026; H04L 25/026; H04L 25/028; H04L 12/40006; H04L 12/40013; H04L 12/40169; H04L 2012/40215
See application file for complete search history.

(56) References Cited

U.S. PATENT DOCUMENTS

| | | | |
|---|---|---|---|
| 9,495,317 B2 | 11/2016 | Metzner et al. | |
| 9,503,409 B2 * | 11/2016 | Heiby | H04W 4/20 |
| 9,858,787 B2 * | 1/2018 | Shuster | G08B 19/00 |
| 11,176,070 B2 | 11/2021 | De Haas et al. | |
| 11,310,072 B2 | 4/2022 | Broughton et al. | |
| 2005/0018659 A1 * | 1/2005 | Gallant | H04L 65/1094 370/395.2 |
| 2007/0121920 A1 * | 5/2007 | Silver | H04M 1/663 379/376.02 |
| 2022/0094567 A1 | 3/2022 | Ou | |

FOREIGN PATENT DOCUMENTS

| | | |
|---|---|---|
| CN | 109479038 A | 3/2019 |
| TW | 201904235 A | 1/2019 |

\* cited by examiner

*Primary Examiner* — Phung-Hoang J Nguyen
(74) *Attorney, Agent, or Firm* — Birch, Stewart, Kolasch & Birch, LLP (57) ABSTRACT

A ringing suppression circuit applicable to a transmitter module in a controller area network is provided, which includes a CANH driver circuit, a CANL driver circuit, a first operable circuit transmitting a CAN high signal, a second operable circuit transmitting a CAN low signal, and a termination component connected between the first operable circuit and the second operable circuit. By sequentially turning on a first, second, and third transistor of the CANH driver circuit and sequentially turning on a fourth, fifth, and sixth transistor of the CANL driver circuit, conventional ringing phenomenon is effectively suppressed. A plurality of transistors may also be configured for implementing the CANH driver circuit or the CANL driver circuit for further reducing a glitch. The transmitter module employing the proposed ringing suppression circuit is able to pull the bus to a recessive state and meanwhile suppress the ringing and improve the maximum data rate.

19 Claims, 8 Drawing Sheets

RINGING SUPPRESSION CIRCUIT

BACKGROUND OF THE INVENTION

Field of the Invention

The present disclosure relates to a Controller Area Network (CAN) bus circuit. And more particularly, it is related to a ringing suppression circuit which is applicable to a transmitter module in the controller area network bus circuit for suppressing the conventional ringing phenomenon.

Description of the Prior Art

As known, Controller Area Network (CAN) is a kind of specification established in early 1990's, got standardized as ISO 11898-1 in 1993, and widely used in all kinds of vehicles and electronic devices later on. In general, the Controller Area Network (CAN) bus includes a serial bus, and the CAN bus is a multi-master serial bus connected on multiple nodes or station numbers in a network in order to provide high security level and efficient real time control. Also, the Controller Area Network is able to ensure debugging and priority determining mechanism, thereby making transmissions for internet messages much more reliable and efficient than ever. The existing CAN bus can be widely used in not only automotive and industrial automation applications, but also in other related fields of applications. Current CAN bus is able to support rapid data rate up to 10 Mb/s. From such a point of view, it is believed that the controller area network nowadays is not only characterized by highly flexible adjustment ability which can accommodate more nodes (station numbers) in existed internet without modifying its software and/or hardware, but also enhances network upgrading conveniences since its data transmission path do not need to build upon certain specific standard stations.

However, what draws our attention is that, the support of such rapid data rate that the CAN bus provides is mainly dependent on and replies on the network that has to be correctly terminated. In specific, a topology of a typical CAN bus network may comprise multiple nodes (station numbers), each located at a varying distance from its terminating resistance(s) at an end node. Among the multiple nodes, a relatively farther node, which is configured away from the terminating resistance(s) may cause reflection during signal transmission periods, thereby generating ringing on the bus.

Figure 1:
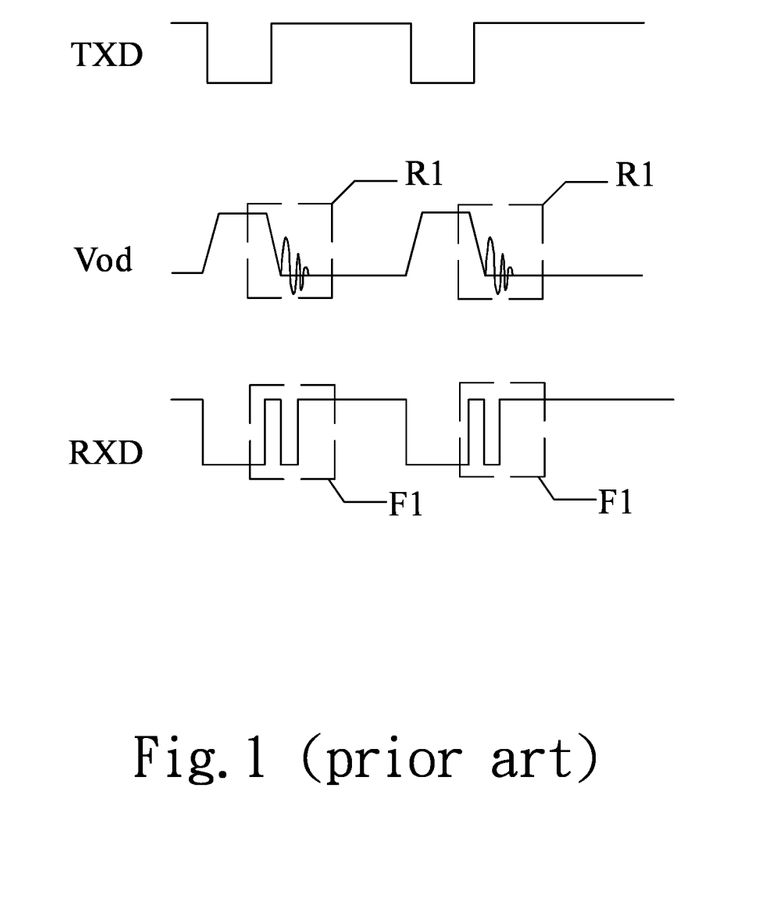
FIG. 1 depicts a plurality of signal waveforms showing the conventional ringing issue on a CAN bus in the prior art.

As known, ringing is a known phenomenon and appears on CAN bus during CAN communication, especially when the bus status transitions from a dominant state to a recessive state. In general, the CAN bus uses a pair of differential wired-AND signals, including a CAN high signal (CANH) and a CAN low signal (CANL). The two signals, CANH and CANL are either driven to a dominant state with the CAN high signal (CANH) greater than the CAN low signal (CANL), or not driven and pulled by terminating resistance(s) to a recessive state with the CAN high signal (CANH) less than or equal to the CAN low signal (CANL). When the bus status transitions from a dominant state to a recessive state, impedance mismatch between cables and each node will cause bus signal reflections which finally cause signal ringing. And, such ringing effect significantly reduce the maximum data rate of the CAN bus and in many cases, the CAN bus ringing becomes a stumbling block when moving towards higher speed CAN bus communication (for instance 5 Mbit/second or even higher). Please find accompanying FIG. 1 for references, which depicts the signal waveforms showing ringing on a CAN bus in the prior art. As illustrated in FIG. 1, TXD shows a transmit (TX) data signal in the CAN bus, RXD shows a receive (RX) data signal in the CAN bus and Vod stands for the CAN bus differential voltage (VCANH−VCANL), in which VCANH is a voltage level of the CAN high signal (CANH) while VCANL is a voltage level of the CAN low signal (CANL). As can be seen from FIG. 1, the CAN bus differential voltage, Vod, as (VCANH-VCANL), will be corrupted during the bus ringing as generating in the region RI. And such ringing issue may in turn leads to communication failures in the receive data signal RXD as illustrated in the region F1. In a further aspect, with the rapid developments of the CAN bus technology nowadays as well as with the increasing baud rates and network size, it is believed that the ringing phenomenon is yet becoming much more severe and even less tolerable. Necessary suppression and elimination of the conventional ringing phenomenon are thus to be expected.

As a result, it, in view of all, should be apparent and obvious that there is indeed an urgent need for the professionals in the field for a novel and inventive ringing suppression circuit to be developed, so as to solve the above-mentioned ringing issues occurring in the prior art. In addition, a maximum data rate of the CAN bus communication is desired when adopting the modified scheme.

SUMMARY OF THE INVENTION

In order to overcome the above-mentioned disadvantages, one major objective in accordance with the present invention is provided for a novel and creative circuit scheme for suppressing the conventional ringing phenomenon. The proposed circuit scheme is characterized by being applicable to a transmitter module in a controller area network (CAN) bus and avoiding the conventional ringing issues.

Another objective in accordance with the present invention is to provide a novel ringing suppression circuit which can be applied to a transmitter module. By employing and disposing the disclosed ringing suppression circuit in a transmitter module, the transmitter module is able to pull the bus to a recessive state and meanwhile provide enough ability to suppress the ringing and to improve the maximum data rate at the same time.

In addition, in the following descriptions, the Applicants further provide a plurality of embodiments and variations that will be discussed later in the following paragraphs in order to verify the ringing suppression circuit and the transmitter module when the disclosed ringing suppression circuit is being applied to are effective. Thereby, it is worthy of full attentions that the present invention achieves to successfully solves the problems of prior arts and meanwhile maintain superior electrical properties. As a result, it is believed that the proposed technical contents of the present invention are extremely advantageous of as being highly competitive and able to be widely utilized in related IC and semiconductor industries.

Therefore, in order to achieve the above-mentioned objectives, the present invention is aimed to provide a modified circuit for ringing suppression.

According to the present invention, the ringing suppression circuit includes a CANH driver circuit, a first operable circuit, a CANL driver circuit, a second operable circuit and a termination component. The CANH driver circuit includes at least one first transistor, at least one second transistor and at least one third transistor, wherein the at least one first transistor is electrically connected with a supplied voltage, the at least one second transistor and the at least one third transistor, the at least one second transistor is electrically connected with the supplied voltage, the at least one first transistor and the at least one third transistor, and the at least one third transistor is electrically connected with the at least one first transistor, the at least one second transistor and a ground. The at least one first transistor, the at least one second transistor and the at least one third transistor are sequentially turned on.

The first operable circuit is electrically connected with the supplied voltage, the ground and the CANH driver circuit, and the first operable circuit performs to generate a CAN high signal (CANH).

The CANL driver circuit includes at least one fourth transistor, at least one fifth transistor and at least one sixth transistor, wherein the at least one fourth transistor is electrically connected with the at least one fifth transistor, the at least one sixth transistor and the ground, the at least one fifth transistor is electrically connected with the at least one fourth transistor, the at least one sixth transistor and the ground, and the at least one sixth transistor is electrically connected with the at least one fourth transistor, the at least one fifth transistor and the supplied voltage. The at least one fourth transistor, the at least one fifth transistor and the at least one sixth transistor are sequentially turned on.

The second operable circuit is electrically connected with the supplied voltage, the ground and the CANL driver circuit, and the second operable circuit performs to generate a CAN low signal (CANL).

The termination component is electrically connected between the first operable circuit and the second operable circuit, such that a first end of the termination component is electrically connected with the CAN high signal (CANH) and a second end of the termination component is electrically connected with the CAN low signal (CANL). According to the embodiment of the present invention, the termination component is preferably, a resistor having 600 resistance.

In one preferred embodiment of the present invention, the disclosed first transistor and second transistor of the CANH driver circuit is a P-type MOSFET, and the third transistor of the CANH driver circuit is an N-type MOSFET.

In one preferred embodiment of the present invention, the disclosed fourth transistor and fifth transistor of the CANL driver circuit is an N-type MOSFET, and the sixth transistor of the CANL driver circuit is a P-type MOSFET.

However, the present invention is not limited thereto such embodiment. In other words, for people who are skilled in the art and having ordinary understandings and technical backgrounds to the present invention, it would be allowed for them to make various modifications or changes depending on different circuit regulations and/or specifications without departing from the scope of the invention. That is to say, the present invention is certainly not limited thereto. And the variant embodiments and/or circuit implementations should still fall into the claim scope of the present invention.

In addition, in order to reduce the glitch of the CAN bus common mode voltage (VCANH+VCANL), in which VCANH is a voltage level of the CAN high signal (CANH) while VCANL is a voltage level of the CAN low signal (CANL), that may affect electromagnetic emission directly, the CANH driver circuit may alternatively include a plurality of the first transistor, a plurality of the second transistor, or a plurality of the third transistor. And the plurality of first transistors, the plurality of second transistors, and the plurality of third transistors are turned on sequentially to reduce the glitch.

In a similar aspect, the CANL driver circuit may alternatively also include a plurality of the fourth transistor, a plurality of the fifth transistor, or a plurality of the sixth transistor. And the plurality of fourth transistors, the plurality of fifth transistors, and the plurality of sixth transistors are turned on sequentially to further reduce the glitch of the CAN bus common mode voltage (VCANH+VCANL) which may affect the electromagnetic emission directly, in which VCANH is a voltage level of the CAN high signal (CANH) while VCANL is a voltage level of the CAN low signal (CANL).

Moreover, regarding the first operable circuit, it is composed of a first control element and a second control element which are electrically connected in cascade. The first control element is electrically connected between the supplied voltage, the CANH driver circuit and the second control element, and the second control element is electrically connected between the first control element, the ground and the first end of the termination component. In one illustrative embodiment of the present invention, the first control element is a high-voltage N-type MOSFET: while the second control element is a high-voltage P-type MOSFET.

The second operable circuit includes a third control element and a fourth control element which are electrically connected in cascade. The third control element is electrically connected between the ground, the second end of the termination component and the fourth control element, and the fourth control element is electrically connected between the third control element, the supplied voltage and the CANL driver circuit. In one illustrative embodiment of the present invention, the third control element is a high-voltage P-type MOSFET: while the fourth control element is a high-voltage N-type MOSFET. In general, according to the present invention, the first control element and the second control element of the first operable circuit and the third control element and the fourth control element of the second operable circuit are configured so as to prevent any unwanted current flowing into the node of the supplied voltage.

In addition, according to the present invention, when the proposed ringing suppression circuit is applicable to a transmitter module in a controller area network (CAN), the transmitter module further includes a control signal generator, in which the control signal generator receives a transmit (TX) data signal and correspondingly generates at least one first control signal, at least one second control signal, and at least one third control signal which are in response to the transmit (TX) data signal.

The at least one first control signal is transmitted to the at least one first transistor for turning on the at least one first transistor, the at least one second control signal is transmitted to the at least one second transistor for turning on the at least one second transistor, and the at least one third control signal is transmitted to the at least one third transistor for turning on the at least one third transistor.

In addition, when the control signal generator receives the transmit (TX) data signal, the control signal generator may also correspondingly generate at least one fourth control signal, at least one fifth control signal and at least one sixth control signal which are in response to the transmit (TX) data signal. According to the embodiment of the present invention, the at least one fourth control signal is transmitted to the at least one fourth transistor for turning on the at least one fourth transistor, the at least one fifth control signal is transmitted to the at least one fifth transistor for turning on the at least one fifth transistor, and the at least one sixth control signal is transmitted to the at least one sixth transistor for turning on the at least one sixth transistor.

In general, those skilled in the art and having general knowledge are able to make appropriate modifications or variations with respective to the technical contents disclosed in the present invention without departing from the spirits of the present invention. The present invention is certainly not restricted by the certain limited configurations and/or circuit diagrams disclosed in the embodiments of the present invention. As such, it is believed that the modifications or variations should still fall into the scope of the present invention, and the present invention covers the modifications and variations.

In another aspect, when the proposed ringing suppression circuit of the present invention is applied to the transmitter module in a controller area network, the CAN high signal (CANH) and the CAN low signal (CANL) are able to be further transmitted and received by a receiver module of the controller area network, such that the receiver module outputs a receive (RX) data signal without generating bit errors.

As a result, based on the disclosed technical features illustrated as above, it is evident that the present invention is sophisticatedly designed and indeed discloses a novel modified scheme for ringing suppression. By employing the present invention, it is believed that the present invention achieves in effectively both suppressing the conventional ringing issue and improving the maximum data rate of the controller area network bus. The proposed ringing suppression circuit is thus inventive and is highly efficient since circuit complexity for implementing the proposed ringing suppression circuit is relatively low.

As a result, it is believed that the proposed ringing suppression circuit and the transmitter module in which the ringing suppression circuit is being applied to and disclosed by the present invention, are beneficial in view of a great number of merits. Thus, it is believed that the present invention is extremely advantageous while compared to the prior arts.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings.

Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The embodiments described below are illustrated to demonstrate the technical contents and characteristics of the present invention and to enable the persons skilled in the art to understand, make, and use the present invention. However, it shall be noticed that it is not intended to limit the scope of the present invention. Therefore, any equivalent modification or variation according to the spirit of the present invention is to be also included within the scope of the present invention.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range.

As the Applicants have described earlier in the Description of the Prior Art, since a ringing phenomenon is generally generated by the reflections of communication voltage wave, which occur because of impedance mismatches in a controller area network at the signal transition frequencies, and the impedance mismatches occur mainly at not-terminated nodes and the junction, the present invention is provided and aimed to solve such ringing phenomenon by proposing a novel and inventive ringing suppression circuit. The disclosed ringing suppression circuit is applicable to a transmitter (TX) module in a controller area network (CAN).

Figure 2:
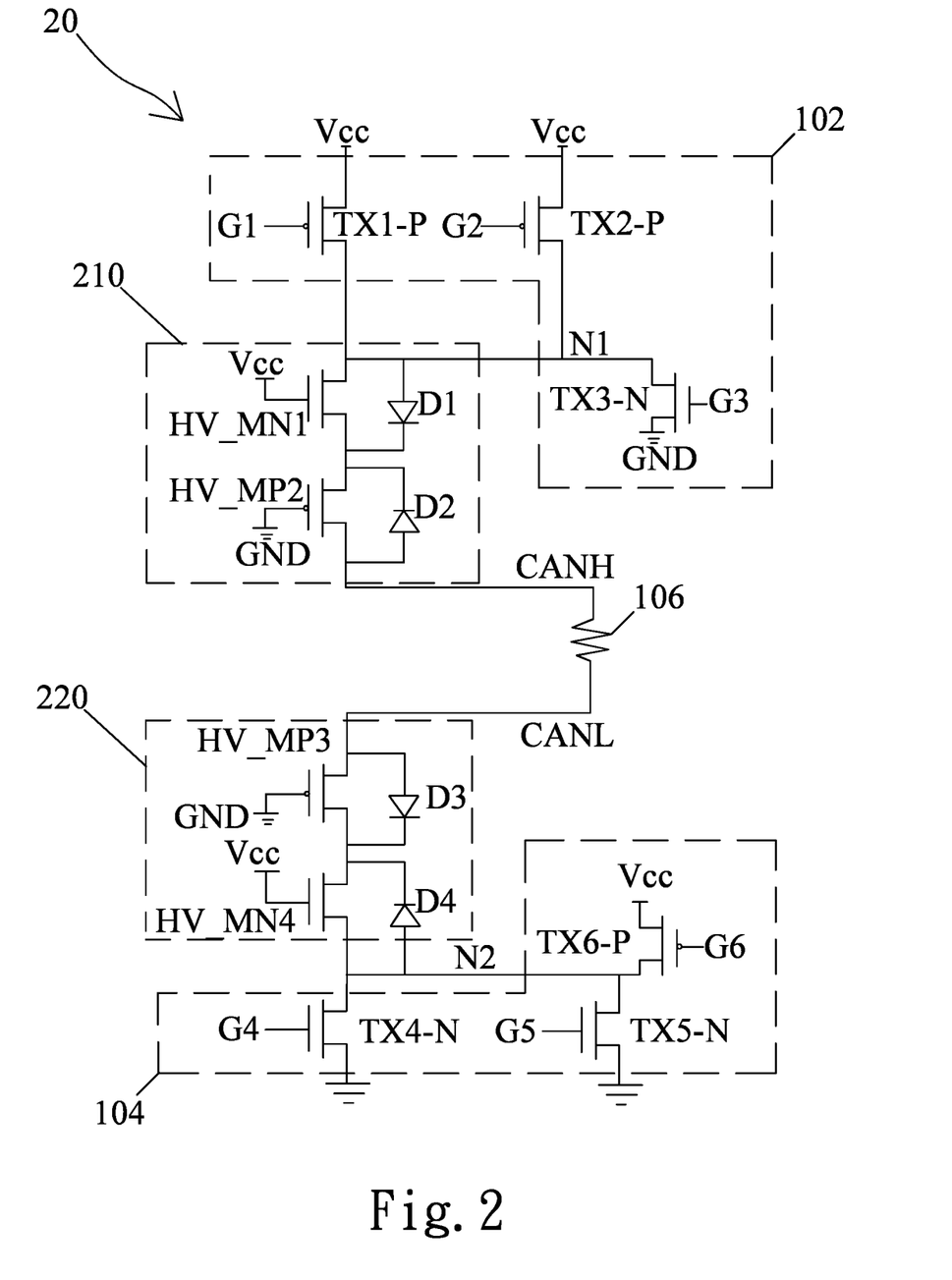
FIG. 2 schematically shows an illustrative diagram of a ringing suppression circuit in accordance with one embodiment of the present invention.

Please refer FIG. 2 which schematically shows an illustrative diagram of a ringing suppression circuit in accordance with one embodiment of the present invention. As shown in FIG. 2, the ringing suppression circuit 20 includes a CANH driver circuit 102, a first operable circuit 210, a second operable circuit 220, a CANL driver circuit 104 and a termination component 106.

According to the embodiment of the present invention, the CANH driver circuit 102 includes a first transistor TX1-P, a second transistor TX2-P and a third transistor TX3-N. The first transistor TX1-P is electrically connected with a supplied voltage Vcc, the second transistor TX2-P, the third transistor TX3-N and the first operable circuit 210. The second transistor TX2-P is electrically connected with the supplied voltage Vcc, the first transistor TX1-P, the third transistor TX3-N and the first operable circuit 210. And the third transistor TX3-N is electrically connected with the first transistor TX1-P, the second transistor TX2-P, the first operable circuit 210 and a ground GND. A first joint node N1 is configured between the first transistor TX1-P, the second transistor TX2-P, the third transistor TX3-N and the first operable circuit 210. According to the embodiment, the first transistor TX1-P and the second transistor TX2-P of the CANH driver circuit 102 is illustrated as a P-type MOSFET. The third transistor TX3-N of the CANH driver circuit 102 is illustrated as an N-type MOSFET. According to such embodiment, the Applicants merely depicts the CANH driver circuit 102 as being composed of one first transistor TX1-P, one second transistor TX2-P and one third transistor TX3-N for describing the technical contents of the present invention. However, the numbers of the first transistor TX1-P, the second transistor TX2-P and the third transistor TX3-N in which the CANH driver circuit 102 includes, may be more than one. In an alternative embodiment of the present invention, the CANH driver circuit 102 may also include a plurality of first transistor TX1-P. Alternatively, the CANH driver circuit 102 may also include a plurality of second transistor TX2-P. And similarly, the CANH driver circuit 102 in yet another embodiment of the present invention, may also further include a plurality of third transistor TX3-N. The applicants will provide further descriptions and discuss later in the following paragraphs. Hereinafter, a relatively low-complexity embodiment as shown in FIG. 2 is disclosed first for merely explaining the technical contents of the present invention. The present invention is not limited thereto such embodiment.

In view of the similar design manners, the CANL driver circuit 104 includes a fourth transistor TX4-N, a fifth transistor TX5-N and a sixth transistor TX6-P. The fourth transistor TX4-N is electrically connected with the fifth transistor TX5-N, the sixth transistor TX6-P, the second operable circuit 220 and the ground GND.

The fifth transistor TX5-N is electrically connected with the fourth transistor TX4-N, the sixth transistor TX6-P, the second operable circuit 220 and the ground GND. And the sixth transistor TX6-P is electrically connected with the fourth transistor TX4-N, the fifth transistor TX5-N, the second operable circuit 220 and the supplied voltage Vcc. A second joint node N2 is configured between the fourth transistor TX4-N, the fifth transistor TX5-N, the sixth transistor TX6-P and the second operable circuit 220.

According to such an embodiment, the fourth transistor TX4-N and the fifth transistor TX5-N of the CANL driver circuit 104 is illustrated as an N-type MOSFET. On the other hand, the sixth transistor TX6-P of the CANL driver circuit 104 is illustrated as a P-type MOSFET. According to such embodiment, the Applicants merely depicts the CANL driver circuit 104 as being composed of one fourth transistor TX4-N, one fifth transistor TX5-N and one sixth transistor TX6-P for introducing the technical contents of the present invention. However, the numbers of the fourth transistor TX4-N, the fifth transistor TX5-N and the sixth transistor TX6-P for fabricating the CANL driver circuit 104 may be more than one. For people who have ordinary knowledge and are skilled in the art, it is obvious that the numbers of the first transistor TX1-P, the second transistor TX2-P and the third transistor TX3-N of the CANH driver circuit 102 as well as the numbers of the fourth transistor TX4-N, the fifth transistor TX5-N and the sixth transistor TX6-P of the CANL driver circuit 104 can be adjusted and modified according to various practical requirements. And these variations still fall into the claim scope of the present invention with equality.

In other words, according to an alternative embodiment of the present invention, the CANL driver circuit 104 may include a plurality of fourth transistor TX4-N. Alternatively, the CANL driver circuit 104 may also include a plurality of fifth transistor TX5-N. And similarly, the CANL driver circuit 104 in yet another embodiment of the present invention, may also further include a plurality of sixth transistor TX6-P. The applicants will provide further descriptions and discuss later in the following paragraphs. Hereinafter, a relatively low-complexity embodiment as shown in FIG. 2 is disclosed first for merely explaining the technical contents of the present invention. The present invention is not limited thereto such embodiment.

According to the embodiment of the present invention, the first operable circuit 210 is electrically connected with the supplied voltage Vcc, the ground GND, the CANH driver circuit 102 and a first end of the termination component 106, and the first operable circuit 210 generates a CAN high signal CANH at the first end of the termination component 106. In view of the embodiment of the present invention, the first operable circuit 210 includes a first control element HV_MN1 and a second control element HV_MP2 which are electrically connected in cascade. The first control element HV_MN1 is electrically connected between the supplied voltage Vcc, the CANH driver circuit 102 and the second control element HV_MP2, and the second control element HV_MP2 is electrically connected between the first control element HV_MN1, the ground GND and the first end of the termination component 106. According to the embodiment, the first control element HV_MN1 is implemented by a high-voltage N-type MOSFET. Similarly, the second control element HV_MP2 in such embodiment as shown in FIG. 2 is implemented by using a high-voltage P-type MOSFET. The first parasitic diode D1 performs as a parasitic body diode of the first control element HV_MN1, while the second parasitic diode D2 performs as a parasitic body diode of the second control element HV_MP2. In general, the first control element HV_MN1 and the second control element HV_MP2 mainly act as diodes so as to prevent any unwanted current flowing from CANH to the node of the supplied voltage Vcc and the ground GND. Without the first control element HV_MN1, when a voltage level of the CAN high signal CANH at the first end of the termination component 106 is higher than the supplied voltage Vcc, it will induce unwanted current from CANH to Vcc through the parasitic body diodes of the first transistor TX1-P and the second transistor TX2-P. On the other hand, without the second control element HV_MP2, when a voltage level of the CAN high signal CANH at the first end of the termination component 106 is lower than a voltage level of the ground GND, it will induce unwanted current from CANH to the ground GND through the parasitic body diode of the third transistor TX3-N. Furthermore, when the proposed ringing suppression circuit is applicable to a transmitter (TX) module, the first control element HV_MN1 and the second control element HV_MP2 may also perform to block the several dozens of common mode voltages from the CAN bus which will damage the device of the transmitter (TX) module.

In another aspect, when considering the second operable circuit 220, the second operable circuit 220 is electrically connected with the supplied voltage Vcc, the ground GND, the CANL driver circuit 104 and a second end of the termination component 106, and the second operable circuit 220 is aimed to generate a CAN low signal CANL at the second end of the termination component 106. According to the embodiment of the present invention, it can be seen that the second operable circuit 220 includes a third control element HV_MP3 and a fourth control element HV_MN4 which are electrically connected in cascade.

The third control element HV_MP3 is electrically connected between the ground GND, the second end of the termination component 106 and the fourth control element HV_MN4, and the fourth control element HV_MN4 is electrically connected between the third control element HV_MP3, the supplied voltage Vcc and the CANL driver circuit 104. According to the embodiment, the third control element HV_MP3 is implemented by a high-voltage P-type MOSFET. Similarly, the fourth control element HV_MN4 in such embodiment as shown in FIG. 2 is implemented by using a high-voltage N-type MOSFET. The third parasitic diode D3 performs as a parasitic body diode of the third control element HV_MP3, while the fourth parasitic diode D4 performs as a parasitic body diode of the fourth control element HV_MN4. In general, the third control element HV_MP3 and the fourth control element HV_MN4 mainly act as diodes so as to prevent any unwanted current flowing from CANL to the node of the supplied voltage Vcc and the ground GND. Without the third control element HV_MP3, when a voltage level of the CAN low signal CANL at the second end of the termination component 106 is lower than a voltage level of the ground GND, it will induce unwanted current from CANL to the ground GND through the parasitic body diodes of the fourth transistor TX4-N and the fifth transistor TX5-N. On the other hand, without the fourth control element HV_MN4, when a voltage level of the CAN low signal CANL at the second end of the termination component 106 is higher than the supplied voltage Vcc, it will induce unwanted current from CANH to Vcc through the parasitic body diode of the sixth transistor TX6-P. According to the similar manners, when the proposed ringing suppression circuit is applicable to a transmitter (TX) module in an alternative variant embodiment of the present invention, then the third control element HV_MP3 and the fourth control element HV_MN4 may also perform to block the several dozens of common mode voltages from the CAN bus which will damage the device of the transmitter (TX) module.

Furthermore, the termination component 106 is electrically connected between the first operable circuit 210 and the second operable circuit 220. More specifically, the termination component 106 is electrically connected between the second control element HV_MP2 of the first operable circuit 210 and the third control element HV_MP3 of the second operable circuit 220, such that at the first end of the termination component 106 is the CAN high signal CANH to be output and being electrically connected with. And at the second end of the termination component 106 is the CAN low signal CANL to be output and being electrically connected with. According to the embodiment of the present invention, the termination component 106 is typically used as a resistor having 60Ω resistance.

Nevertheless, it draws our attention that, the present invention is not limited thereto by the foregoing schematic diagram, and yet some alternative variations and embodiments will be provided and discussed by the applicants of the present invention later in the following paragraphs of the invention application.

Figure 3:
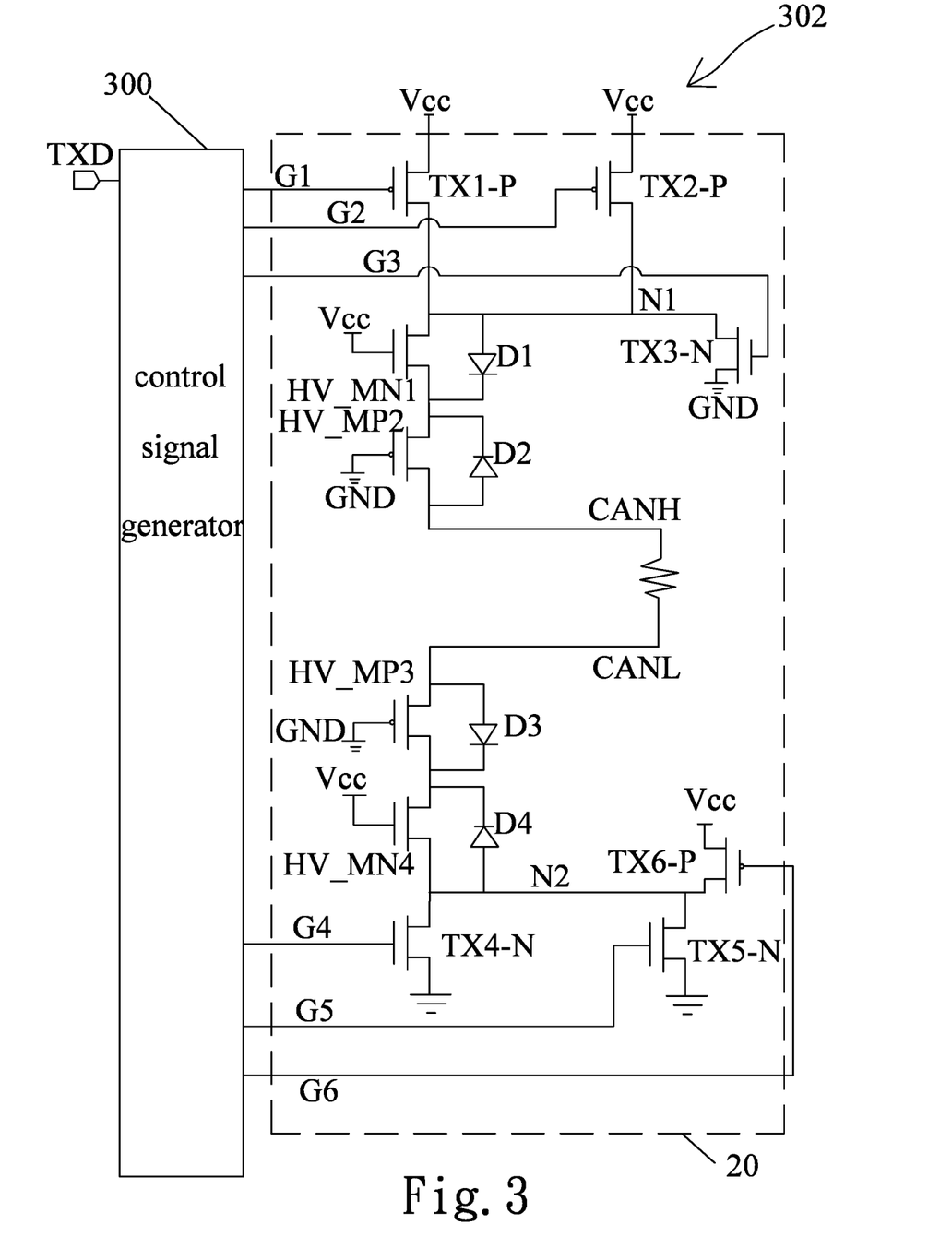
FIG. 3 schematically shows an illustrative diagram when the proposed ringing suppression circuit is applicable to a transmitter module in a controller area network in accordance with the embodiment of the present invention.

Subsequently, please refer to FIG. 3, in which FIG. 3 schematically shows an illustrative diagram when the proposed ringing suppression circuit is applicable to a transmitter module in a controller area network in accordance with the embodiment of the present invention. Please refer to FIG. 2 and FIG. 3 at the same time, the ringing suppression circuit 20 as previously described is now applied to a transmitter module 302 in a controller area network. As can be seen in FIG. 3, the transmitter module 302 further comprises a control signal generator 300, and the control signal generator 300 receives a transmit (TX) data signal TXD. As a result, upon receiving the transmit (TX) data signal TXD, the control signal generator 300 correspondingly generates at least one first control signal G1, at least one second control signal G2 and at least one third control signal G3 which are in response to the transmit (TX) data signal TXD. According to the embodiment of the present invention, the first control signal G1 is transmitted to the first transistor TX1-P of the CANH driver circuit 102 for turning on the first transistor TX1-P. The second control signal G2 is transmitted to the second transistor TX2-P of the CANH driver circuit 102 for turning on the second transistor TX2-P, and the third control signal G3 is transmitted to the third transistor TX3-N of the CANH driver circuit 102 for turning on the third transistor TX3-N.

As previously described, according to the alternative embodiment of the present invention when the CANH driver circuit 102 includes a plurality of first transistor TX1-P, a plurality of second transistor TX2-P or a plurality of third transistor TX3-N, then a plurality of first control signal G1 will be generated to be transmitted to the plurality of first transistor TX1-P for turning on the plurality of first transistor TX1-P. A plurality of second control signal G2 will be generated to be transmitted to the plurality of second transistor TX2-P for turning on the plurality of second transistor TX2-P. A plurality of third control signal G3 will be generated to be transmitted to the plurality of third transistor TX3-N for turning on the plurality of third transistor TX3-N. Each of the first control signals G1, the second control signals G2 and the third control signals G3 is used to control and turn on one of the first transistor TX1-P, the second transistor TX2-P and the third transistor TX3-N, respectively.

Figure 4:
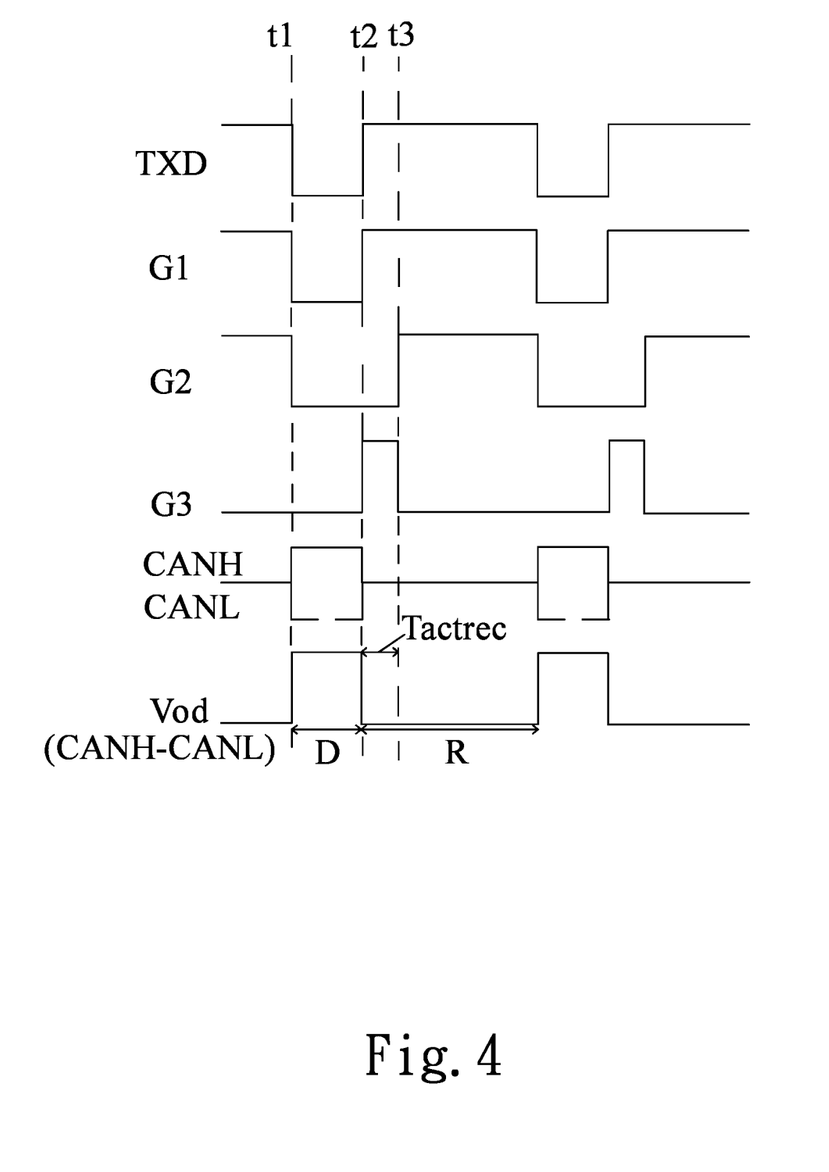
FIG. 4 schematically shows a plurality of signal waveforms in view of the CANH driver circuit when the proposed ringing suppression circuit is applied to the transmitter module in the controller area network in accordance with the embodiment as shown in FIG. 3 of the present invention.

Subsequently, please refer to FIG. 4 for a plurality of signal waveforms, depicting the transmit (TX) data signal TXD, the first control signal G1, the second control signal G2, the third control signal G3, the CAN high signal CANH, the CAN low signal CANL and the CAN bus differential voltage Vod, in view of the CANH driver circuit when the proposed ringing suppression circuit is applied to the transmitter module in the controller area network in accordance with the embodiment as shown in FIG. 3 of the present invention. As can be seen in FIG. 4, the first control signal G1 which is used to control and turn on the first transistor TX1-P is identical to the transmit (TX) data signal TXD. The first control signal G1 is then transmitted to a gate terminal of the first transistor TX1-P. The second control signal G2 which is used to control and turn on the second transistor TX2-P as well as the third control signal G3 which is used to control and turn on the third transistor TX3-N are related and in response to the transmit (TX) data signal TXD. The second control signal G2 is transmitted to a gate terminal of the second transistor TX2-P. And the third control signal G3 is transmitted to a gate terminal of the third transistor TX3-N. As illustrated from the first, second and third control signal waveforms of G1, G2 and G3 in FIG. 4, it is apparent that the first transistor TX1-P, the second transistor TX2-P and the third transistor TX3-N of the CANH driver circuit 102 are sequentially turned on.

The CAN high signal CANH and the CAN low signal CANL are generated respectively at the first end of the termination component 106 and at the second end of the termination component 106. The CAN bus differential voltage Vod is a differential voltage signal between the CAN high signal CANH and the CAN low signal CANL, indicating that (Vod=CANH−CANL). As illustrated in the waveforms in FIG. 4, the CAN high signal CANH is depicted by a solid line, while the CAN low signal CANL is depicted by a dashed line.

As we can see, at t−t1, the transmit (TX) data signal TXD sends a dominate signal to the transmitter module, and the first control signal G1 and the second control signal G2 respectively turns on the first transistor TX1-P and the second transistor TX2-P. As a result, it starts to drive the CAN bus differential voltage Vod (CANH−CANL) to a high voltage level, for instance, 2V. At this point of time, the CAN bus differential voltage Vod enters in a dominate state, labeled as "D" in FIG. 4.

Then, at t=t2, the transmit (TX) data signal TXD sends a recessive signal to the transmitter module, and the first control signal G1 starts to turn off the first transistor TX1-P while the second transistor TX2-P is stilled turned on. At the same time, the third control signal G3 starts to turn on the third transistor TX3-N. As a result, the third transistor TX3-N performs to start pumping out the current of the second transistor TX2-P and the CAN bus enters in a recessive state, labeled as "R" in FIG. 4.

Later, during t2<t<t3 (illustrated as "Tactrec" in FIG. 4), that is called an active recessive state. In such a period of time during Tactrec, it is believed that the current of the second transistor TX2-P fully flows to the third transistor TX3-N, such that there is no current flowing to the CAN bus. As a result, it is obvious that due to the above-disclosed mechanism, the CAN bus differential voltage Vod is reduced to zero. And after that, the second transistor TX2-P and the third transistor TX3-N will be turned off respectively by the second control signal G2 and the third control signal G3 slowly after t=t3.

To be more specific, since the voltage of the first joint node N1 is biased by the second transistor TX2-P and the third transistor TX3-N actively and the input resistance (Ri) of the CAN bus is also decided by the second transistor TX2-P and the third transistor TX3-N and believed to be controlled in a low impedance state when the CAN bus transits from the dominant state "D" to the recessive state "R" and also in the active recessive state, as a result, it is evident that by employing the proposed scheme of the present invention, the disclosed circuit diagram effectively achieves in suppressing the conventional ringing phenomenon.

Furthermore, since a glitch of the CAN high signal CANH and the CAN low signal CANL may affect electromagnetic emission directly, in order to reduce the glitch of (CANH+ CANL), the first transistor TX1-P, the second transistor TX2-P and the third transistor TX3-N of the CANH driver circuit 102 can be made of one or more transistors. By sequentially turning on the at least one first transistor TX1-P, the at least one second transistor TX2-P and the at least one third transistor TX3-N, it is believed that the present invention further achieves in reducing the glitch of (CANH+CANL) and a superior electromagnetic emission (EME) performance can thus be maintained.

And yet, from another point of view, as can be seen in view of FIG. 3, the control signal generator 300 receives the transmit (TX) data signal TXD. And, upon receiving the transmit (TX) data signal TXD, the control signal generator 300 in addition, correspondingly generates at least one fourth control signal G4, at least one fifth control signal G5 and at least one sixth control signal G6 which are in response to the transmit (TX) data signal TXD. According to the embodiment of the present invention, the fourth control signal G4 is transmitted to the fourth transistor TX4-N of the CANL driver circuit 104 for turning on the fourth transistor TX4-N. The fifth control signal G5 is transmitted to the fifth transistor TX5-N of the CANL driver circuit 104 for turning on the fifth transistor TX5-N and the sixth control signal G6 is transmitted to the sixth transistor TX6-P of the CANL driver circuit 104 for turning on the sixth transistor TX6-P.

As previously described, according to the alternative embodiment of the present invention when the CANL driver circuit 104 further includes a plurality of fourth transistor TX4-N, a plurality of fifth transistor TX5-N or a plurality of sixth transistor TX6-P, under such a circumstance, a plurality of fourth control signal G4 will then be generated to be transmitted to the plurality of fourth transistor TX4-N for turning on the plurality of fourth transistor TX4-N. Similarly, a plurality of fifth control signal G5 will be generated to be transmitted to the plurality of fifth transistor TX5-N for turning on the plurality of fifth transistor TX5-N. And, a plurality of sixth control signal G6 will be generated to be transmitted to the plurality of sixth transistor TX6-P for turning on the plurality of sixth transistor TX6-P. Each of the fourth control signals G4, the fifth control signals G5 and the sixth control signals G6 is used to control and turn on one of the fourth transistor TX4-N, the fifth transistor TX5-N and the sixth transistor TX6-P, respectively.

Figure 5:
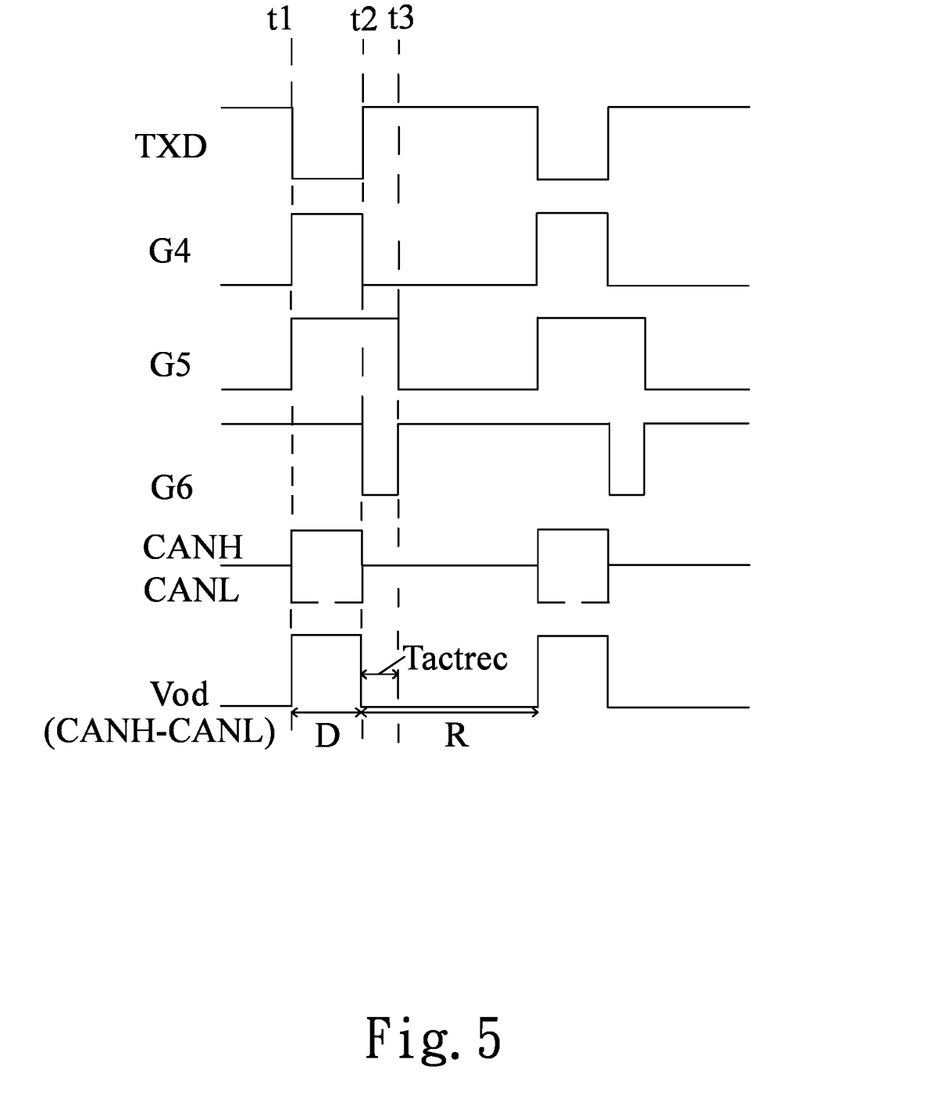
FIG. 5 schematically shows a plurality of signal waveforms in view of the CANL driver circuit when the proposed ringing suppression circuit is applied to the transmitter module in the controller area network in accordance with the embodiment as shown in FIG. 3 of the present invention.

And furthermore, please refer to FIG. 5 for a plurality of signal waveforms, depicting the transmit (TX) data signal TXD, the fourth control signal G4, the fifth control signal G5, the sixth control signal G6, the CAN high signal CANH, the CAN low signal CANL and the CAN bus differential voltage Vod, in view of the CANL driver circuit when the proposed ringing suppression circuit is applied to the transmitter module in the controller area network in accordance with the embodiment as shown in FIG. 3 of the present invention. As can be seen in FIG. 5, the fourth control signal G4 which is used to control and turn on the fourth transistor TX4-N is related and in response to the transmit (TX) data signal TXD. The fourth control signal G4 is transmitted to a gate terminal of the fourth transistor TX4-N. The fifth control signal G5 which is used to control and turn on the fifth transistor TX5-N is related and in response to the transmit (TX) data signal TXD. The fifth control signal G5 is transmitted to a gate terminal of the fifth transistor TX5-N. The sixth control signal G6 which is used to control and turn on the sixth transistor TX6-P is related and in response to the transmit (TX) data signal TXD. The sixth control signal G6 is transmitted to a gate terminal of the sixth transistor TX6-P. As illustrated from the fourth, the fifth and the sixth control signal waveforms of G4, G5 and G6 in FIG. 5, it is apparent that the fourth transistor TX4-N, the fifth transistor TX5-N and the sixth transistor TX6-P of the CANL driver circuit 104 are sequentially turned on.

Since the CAN high signal CANH and the CAN low signal CANL are generated respectively at the first end of the termination component 106 and at the second end of the termination component 106, the CAN bus differential voltage Vod is a differential voltage signal between the CAN high signal CANH and the CAN low signal CANL, indicating that (Vod=CANH−CANL). As illustrated in the waveforms in FIG. 5, the CAN high signal CANH is depicted by a solid line, while the CAN low signal CANL is depicted by a dashed line.

As we can see from FIG. 5 waveforms, at t=t1, the transmit (TX) data signal TXD sends a dominate signal to the transmitter module, and the fourth control signal G4 and the fifth control signal G5 respectively turns on the fourth transistor TX4-N and the fifth transistor TX5-N. As a result, it starts to drive the CAN bus differential voltage Vod (CANH−CANL) to a high voltage level, for instance, 2V. And at this point of time, it starts to drive the CAN bus differential voltage Vod entering in a dominate state, which is labeled as "D" in FIG. 5.

And then, at t=t2, the transmit (TX) data signal TXD sends a recessive signal to the transmitter module, and the fourth control signal G4 starts to turn off the fourth transistor TX4-N while the fifth transistor TX5-N is stilled turned on. At the same time, the sixth control signal G6 starts to turn on the sixth transistor TX6-P. As a result, it is believed that the sixth transistor TX6-P performs to start pumping out the current of the fifth transistor TX5-N so that the CAN bus enters in a recessive state, which is labeled as "R" in FIG. 5.

Later on, during t2<t<t3 (illustrated as "Tactrec" in FIG. 5), that is called an active recessive state. In such a period of time during Tactrec, it is believed that the current of the fifth transistor TX5-N fully flows to the sixth transistor TX6-P, such that there is no current flowing to the CAN bus. As a result, it is obvious that due to the above-disclosed mechanism, the CAN bus differential voltage Vod is reduced to zero. And after that, the fifth transistor TX5-N and the sixth transistor TX6-P will be turned off respectively by the fifth control signal G5 and the sixth control signal G6 slowly after t=t3.

To be more specific, since the voltage of the second joint node N2 is biased by the fifth transistor TX5-N and the sixth transistor TX6-P actively and the input resistance (Ri) of the CAN bus is also decided by the fifth transistor TX5-N and the sixth transistor TX6-P and believed to be controlled in a low impedance state when the CAN bus transits from the dominant state "D" to the recessive state "R" and also in the active recessive state, as a result, it is well proven that by employing the proposed scheme of the present invention, the disclosed circuit diagram proposed by the present invention effectively and significantly achieves in suppressing the conventional ringing phenomenon.

Furthermore, since a glitch of the CAN high signal CANH and the CAN low signal CANL may affect electromagnetic emission directly, in order to reduce the glitch of (CANH+CANL), the fourth transistor TX4-N, the fifth transistor TX5-N and the sixth transistor TX6-P of the CANL driver circuit 104 can be made of one or more transistors. By sequentially turning on the at least one fourth transistor TX4-N, the at least one fifth transistor TX5-N and the at least one sixth transistor TX6-P, it is believed that the present invention is able to further achieve in reducing the glitch of (CANH+CANL) and a superior electromagnetic emission (EME) performance can thus be maintained.

In the following paragraphs, the Applicant further provide FIG. 6 and FIG. 7 for demonstrating when the proposed ringing suppression circuit is applied to the transmitter module in the controller area network and is operating under a plurality of various level phase modes. Please refer to FIG. 6 first, in which a plurality of signal waveforms are shown, depicting the transmit (TX) data signal TXD, the first control signal G1, the second control signal G2, the third control signal G3, the CAN high signal CANH, the CAN low signal CANL and the CAN bus differential voltage Vod, in view of the CANH driver circuit when the proposed ringing suppression circuit is applied to the transmitter module in the controller area network in accordance with the embodiment as shown in FIG. 3 of the present invention. As described previously, the first control signal G1 is transmitted to a gate terminal of the first transistor TX1-P and the first control signal G1 is used to control and turn on the first transistor TX1-P. The second control signal G2 is transmitted to a gate terminal of the second transistor TX2-P and the second control signal G2 is used to control and turn on the second transistor TX2-P. The third control signal G3 is transmitted to a gate terminal of the third transistor TX3-N and the third control signal G3 is used to control and turn on the third transistor TX3-N.

Figure 7:
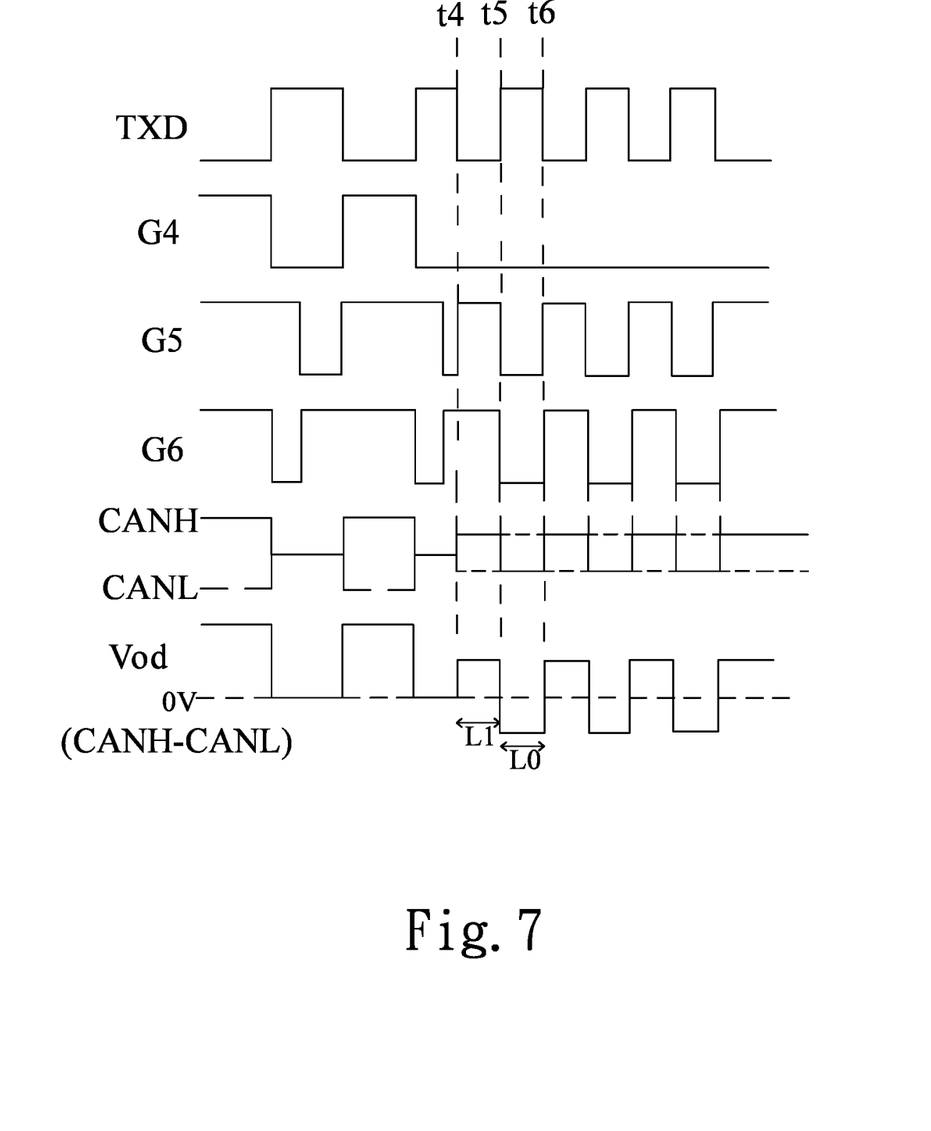
FIG. 7 schematically shows a plurality of signal waveforms in view of the CANL driver circuit when the proposed ringing suppression circuit is applied to the transmitter module in the controller area network in accordance with one another embodiment as shown in FIG. 3 of the present invention, indicating a various operating level phase.

On the other hand, FIG. 7 similarly shows a plurality of signal waveforms in view of the CANL driver circuit when the proposed ringing suppression circuit is applied to the transmitter module in the controller area network in accordance with the embodiment as shown in FIG. 3 of the present invention, indicating a various operating level phase. As can be seen, the fourth control signal G4 is transmitted to a gate terminal of the fourth transistor TX4-N and the fourth control signal G4 is used to control and turn on the fourth transistor TX4-N. The fifth control signal G5 is transmitted to a gate terminal of the fifth transistor TX5-N and the fifth control signal G5 is used to control and turn on the fifth transistor TX5-N. The sixth control signal G6 is transmitted to a gate terminal of the sixth transistor TX6-P and the sixth control signal G6 is used to control and turn on the sixth transistor TX6-P.

The CAN high signal CANH and the CAN low signal CANL are generated respectively at the first end of the termination component 106 and at the second end of the termination component 106. And, the CAN bus differential voltage Vod is a differential voltage signal between the CAN high signal CANH and the CAN low signal CANL, indicating that (Vod=CANH−CANL). As illustrated in the waveforms in both the FIG. 6 and the FIG. 7, the CAN high signal CANH will be depicted by a solid line, while the CAN low signal CANL will be depicted by a dashed line.

As we can see from the transmitter (TX) data signal TXD, before t-t4, the transmitter only transmits the CAN-FD signal, in which it is known that "CAN-FD" (Controller Area Network Flexible Data-Rate) is an extension to the original CAN bus protocol that was specified in ISO 11898-1. Later, after t=t4, the transmitter starts to work in a Fast-TX mode, which allows to transmit more payload with a transmission speed faster than 10 Mbps. (CAN-XL). As known, CAN-XL (Controller Area Network Extra Long) is the third generation of CAN data link layer which supports all three protocol types, including: a Classical CAN mode, a CAN-FD mode, and a CAN-XL mode. The CAN-XL mode is based on the concepts as specified in ISO 11898-1:2015. Since the CiA SIG (Special Interest Group) in December 2018, CAN-XL is specifying the CAN-XL protocol features.

And then, when t is between t4 and t5 (during t4<t<t5), the transmit (TX) data signal TXD is logic 0 and the transmitter enters a level 1 phase "L1", replacing a dominate state in CAN-FD. During the level 1 phase "L1", the first transistor TX1-P, the third transistor TX3-N, the fourth transistor TX4-N and the sixth transistor TX6-P will be turned off while the second transistor TX2-P and the fifth transistor TX5-N will be turned on, such that a smaller CAN bus differential voltage Vod will be generated. It is also known that such a smaller CAN bus differential voltage Vod in Fast TX mode is less than a typical Vod in SIC mode, which is one of operating mode in CAN-XL.

And subsequently, when t is between t5 and t6 (during t5<t<t6), the transmit (TX) data signal TXD turns to logic 1 and the transmitter enters a level 0 phase "L0", replacing a recessive state in CAN-FD. During the level 0 phase "L0", the first transistor TX1-P, the second transistor TX2-P, the fourth transistor TX4-N and the fifth transistor TX5-N will be turned off while the third transistor TX3-N and the sixth transistor TX6-P will be turned on. As a result, it can be seen that, the generated CAN bus differential voltage Vod obtained in the level 0 phase "L0" will have an opposite polarity to its previous polarity as in the level 1 phase "L1".

Figure 6:
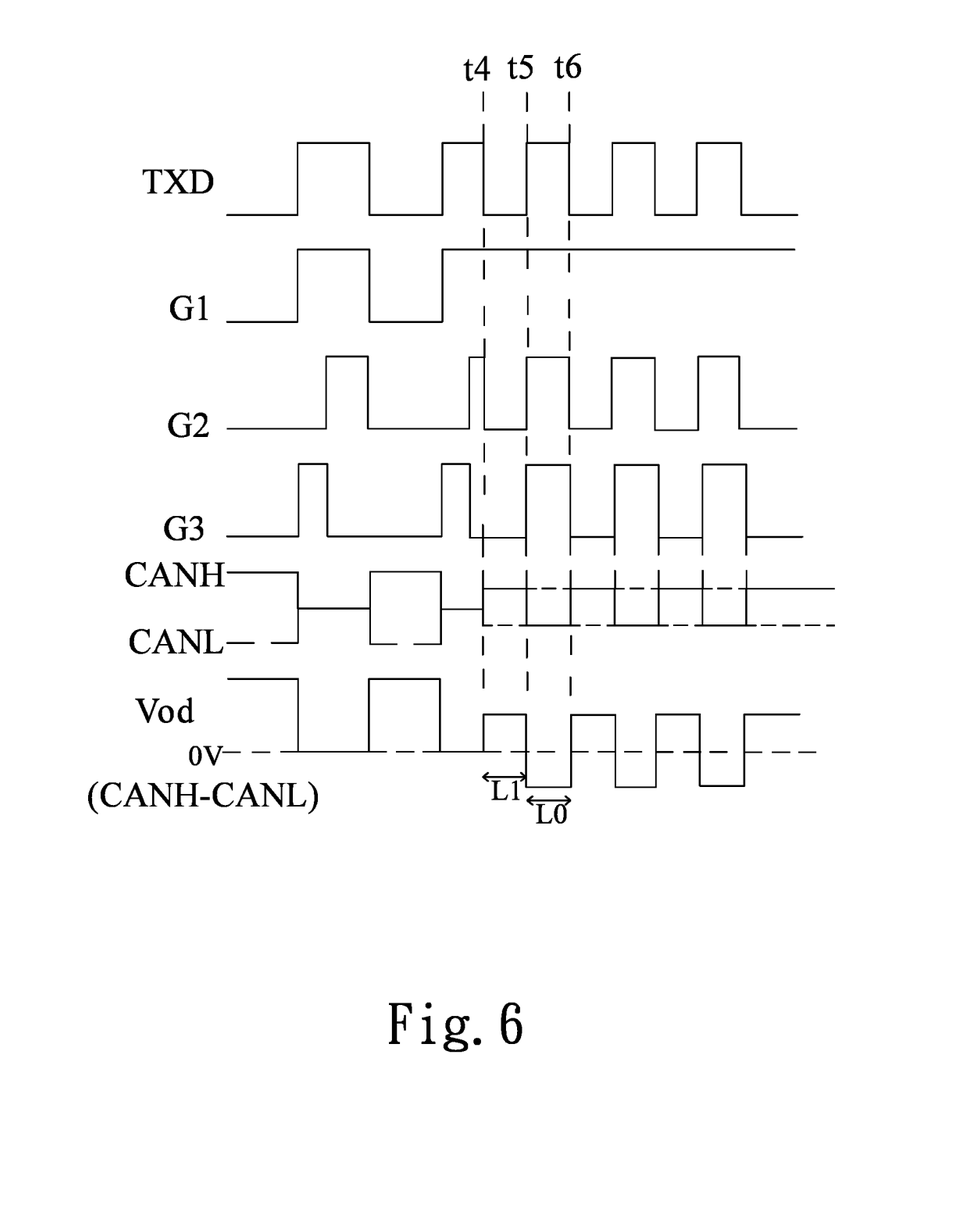
FIG. 6 schematically shows a plurality of signal waveforms in view of the CANH driver circuit when the proposed ringing suppression circuit is applied to the transmitter module in the controller area network in accordance with one another embodiment as shown in FIG. 3 of the present invention, indicating a various operating level phase.

In addition, as we can observe from the two waveform diagrams shown in FIG. 6 and FIG. 7, since either when the driver is operating in the level 1 phase "L1" or in the level 0 phase "L0", the driver is always on. And therefore, there will be no transition period between these two phases: the level 0 phase "L0" and the level 1 phase "L1". In other words, according to the disclosed invention of the application, the impedance of the driver can be made and controlled to be extremely low, and can be designed in a fixed value in order to reduce the ringing issue caused due to an impedance mismatch. The proposed present invention is thus believed to be effective in reducing and suppressing the conventional ringing problems.

In view of the above-mentioned verification results and waveforms to be provided, as CAN bus speeds have greatly increased in the recent years, the conventional ringing issue has also increased. As a CAN bus transceiver transitions from a "dominant state" to a "recessive state", reflections from improperly terminated stubs may cause ringing on the transceiver. And when the magnitude of the ringing is high enough, a transceiver will misinterpret the ringing as a dominant bit. As such, the unwanted ringing phenomenon has been known to cause bit errors. In order to solve the foregoing deficiency, the present invention is thus provided, and in view of the above-mentioned technical contents of the present invention, it is believed that ringing on the controller area network bus due to improper electrical termination can be successfully eliminated and suppressed by using the disclosed ringing suppression circuit of the present invention.

Figure 8:
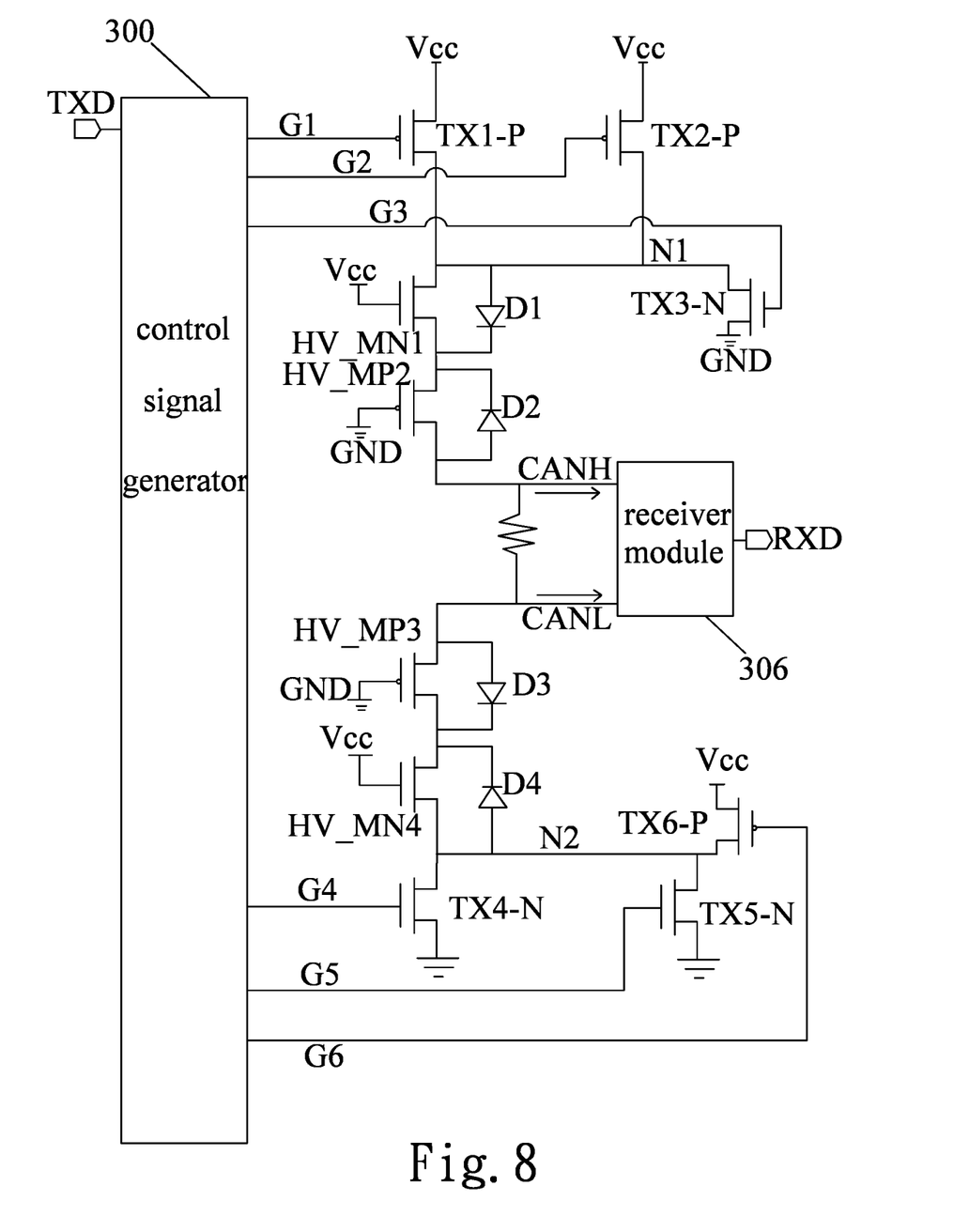
FIG. 8 schematically shows an illustrative diagram when a receiver module of the controller area network is further employed so as to generate a receive (RX) data signal.

Please proceed to refer to FIG. 8, which schematically shows an illustrative diagram when a receiver module of the controller area network is further employed so as to generate a receive (RX) data signal. As can be seen in FIG. 6, it discloses that by employing the present invention, since ringing on the controller area network bus is effectively suppressed, the CAN high signal CANH and the CAN low signal CANL can be further transmitted and received by a receiver module 306 of the controller area network, such that the receiver module 306 outputs a receive (RX) data signal RXD without generating bit errors.

Hereinafter, according to the technical contents of the present invention which have been provided by the Applicants as illustrated in the previous paragraphs, it is obvious that the ringing suppression circuit is effective. Meanwhile, a maximum data rate of the controller area network bus is accomplished by adopting the present invention. Therefore, in view of all, it is obvious that the present invention is not only novel and inventive but also believed to be advantageous of solving and avoiding the conventional ringing phenomenon.

As a result, when compared to the prior arts, it is ensured that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A ringing suppression circuit, applicable to a transmitter module in a controller area network (CAN), comprising:
    a CANH driver circuit, comprising at least one first transistor, at least one second transistor and at least one third transistor, wherein the at least one first transistor is electrically connected with a supplied voltage, the at least one second transistor and the at least one third transistor, the at least one second transistor is electrically connected with the supplied voltage, the at least one first transistor and the at least one third transistor, the at least one third transistor is electrically connected with the at least one first transistor, the at least one second transistor and a ground, and the at least one first transistor, the at least one second transistor and the at least one third transistor are sequentially turned on;
    a first operable circuit, being electrically connected with the supplied voltage, the ground and the CANH driver circuit, and the first operable circuit transmitting a CAN high signal (CANH);
    a CANL driver circuit, comprising at least one fourth transistor, at least one fifth transistor and at least one sixth transistor, wherein the at least one fourth transistor is electrically connected with the at least one fifth transistor, the at least one sixth transistor and the ground, the at least one fifth transistor is electrically connected with the at least one fourth transistor, the at least one sixth transistor and the ground, the at least one sixth transistor is electrically connected with the at least one fourth transistor, the at least one fifth transistor and the supplied voltage, and the at least one fourth transistor, the at least one fifth transistor and the at least one sixth transistor are sequentially turned on;
    a second operable circuit, being electrically connected with the supplied voltage, the ground and the CANL driver circuit, and the second operable circuit transmitting a CAN low signal (CANL); and
    a termination component, being electrically connected between the first operable circuit and the second operable circuit, such that a first end of the termination component is electrically connected with the CAN high signal (CANH) and a second end of the termination component is electrically connected with the CAN low signal (CANL).

2. The ringing suppression circuit according to claim 1, wherein the at least one first transistor and the at least one second transistor of the CANH driver circuit is a P-type MOSFET, and the at least one third transistor of the CANH driver circuit is an N-type MOSFET.

3. The ringing suppression circuit according to claim 1, wherein the at least one fourth transistor and the at least one fifth transistor of the CANL driver circuit is an N-type MOSFET, and the at least one sixth transistor of the CANL driver circuit is a P-type MOSFET.

4. The ringing suppression circuit according to claim 1, wherein the CANH driver circuit comprises a plurality of the at least one first transistor, and the plurality of the at least one first transistor is turned on sequentially to reduce a glitch of the CAN high signal (CANH) and the CAN low signal (CANL).

5. The ringing suppression circuit according to claim 1, wherein the CANH driver circuit comprises a plurality of the at least one second transistor, and the plurality of the at least one second transistor is turned on sequentially to reduce a glitch of the CAN high signal (CANH) and the CAN low signal (CANL).

6. The ringing suppression circuit according to claim 1, wherein the CANH driver circuit comprises a plurality of the at least one third transistor, and the plurality of the at least one third transistor is turned on sequentially to reduce a glitch of the CAN high signal (CANH) and the CAN low signal (CANL).

7. The ringing suppression circuit according to claim 1, wherein the first operable circuit comprises a first control element and a second control element which are electrically connected in cascade, the first control element is electrically connected between the supplied voltage, the CANH driver circuit and the second control element, and the second control element is electrically connected between the first control element, the ground and the first end of the termination component.

8. The ringing suppression circuit according to claim 7, wherein the first control element is a high-voltage N-type MOSFET.

9. The ringing suppression circuit according to claim 7, wherein the second control element is a high-voltage P-type MOSFET.

10. The ringing suppression circuit according to claim 1, wherein the second operable circuit comprises a third control element and a fourth control element which are electrically connected in cascade, the third control element is electrically connected between the ground, the second end of the termination component and the fourth control element, and the fourth control element is electrically connected between the third control element, the supplied voltage and the CANL driver circuit.

11. The ringing suppression circuit according to claim 10, wherein the third control element is a high-voltage P-type MOSFET.

12. The ringing suppression circuit according to claim 10, wherein the fourth control element is a high-voltage N-type MOSFET.

13. The ringing suppression circuit according to claim 1, wherein the transmitter module further comprises a control signal generator, the control signal generator receives a transmit (TX) data signal and correspondingly generates at least one first control signal, at least one second control signal and at least one third control signal which are in response to the transmit (TX) data signal, and wherein the at least one first control signal is transmitted to the at least one first transistor for turning on the at least one first transistor, the at least one second control signal is transmitted to the at least one second transistor for turning on the at least one second transistor, and the at least one third control signal is transmitted to the at least one third transistor for turning on the at least one third transistor.

14. The ringing suppression circuit according to claim 1, wherein the transmitter module further comprises a control signal generator, the control signal generator receives a transmit (TX) data signal and correspondingly generates at least one fourth control signal, at least one fifth control signal and at least one sixth control signal which are in response to the transmit (TX) data signal, and wherein the at least one fourth control signal is transmitted to the at least one fourth transistor for turning on the at least one fourth transistor, the at least one fifth control signal is transmitted to the at least one fifth transistor for turning on the at least one fifth transistor, and the at least one sixth control signal is transmitted to the at least one sixth transistor for turning on the at least one sixth transistor.

15. The ringing suppression circuit according to claim 1, wherein the CANL driver circuit comprises a plurality of the at least one fourth transistor, and the plurality of the at least one fourth transistor is turned on sequentially to reduce a glitch of the CAN high signal (CANH) and the CAN low signal (CANL).

16. The ringing suppression circuit according to claim 1, wherein the CANH driver circuit comprises a plurality of the at least one fifth transistor, and the plurality of the at least one fifth transistor is turned on sequentially to reduce a glitch of the CAN high signal (CANH) and the CAN low signal (CANL).

17. The ringing suppression circuit according to claim 1, wherein the CANH driver circuit comprises a plurality of the at least one sixth transistor, and the plurality of the at least one sixth transistor is turned on sequentially to reduce a glitch of the CAN high signal (CANH) and the CAN low signal (CANL).

18. The ringing suppression circuit according to claim 1, wherein the termination component is a resistor having 600Ω resistance.

19. The ringing suppression circuit according to claim 1, wherein the CAN high signal (CANH) and the CAN low signal (CANL) are further transmitted and received by a receiver module of the controller area network (CAN), such that the receiver module outputs a receive (RX) data signal without generating bit errors.

* * * * *